June 26, 1934.   C. J. VAN DOREN   1,964,097
SPRINKLING DEVICE
Filed June 16, 1933
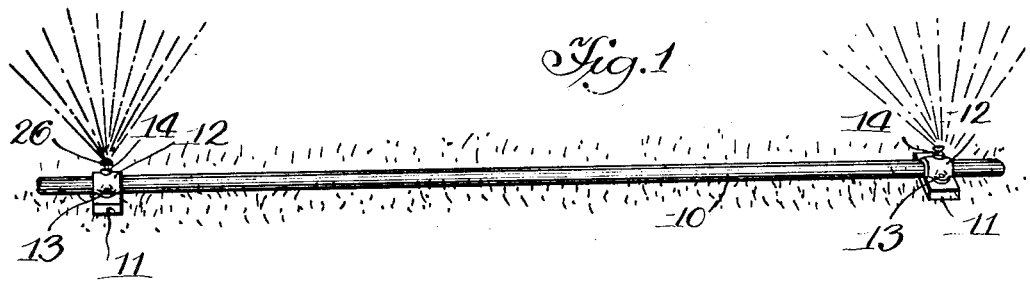
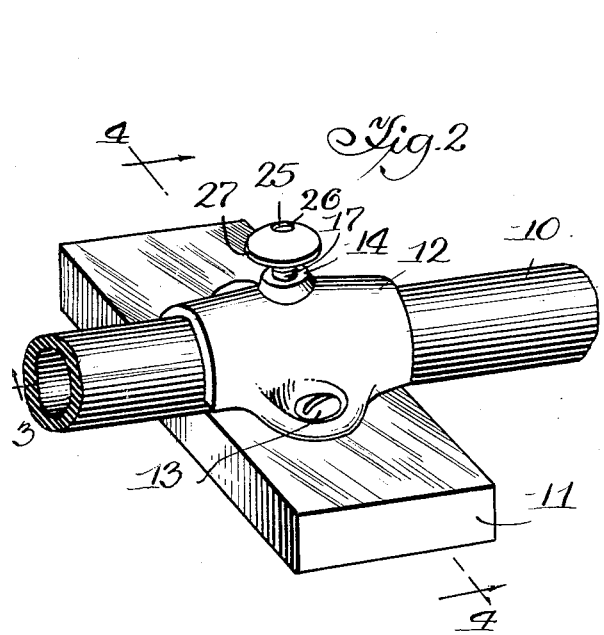
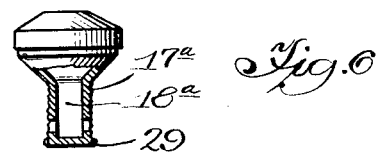
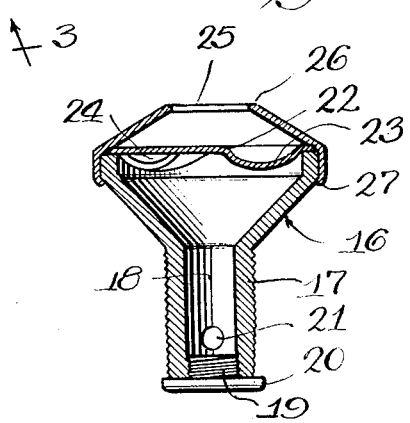
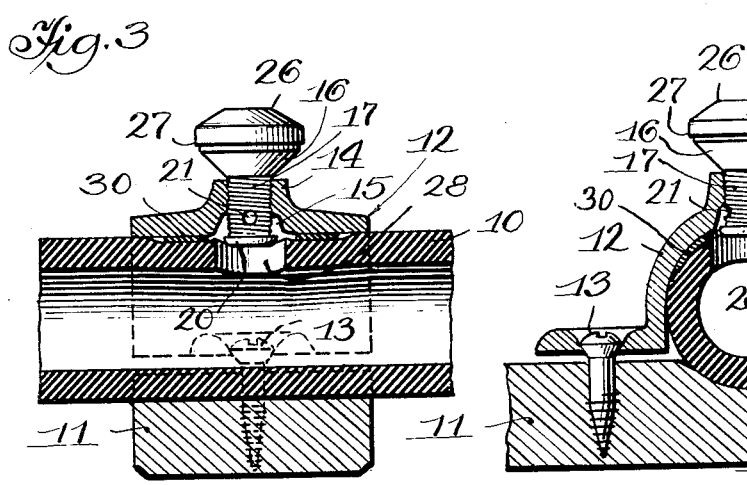
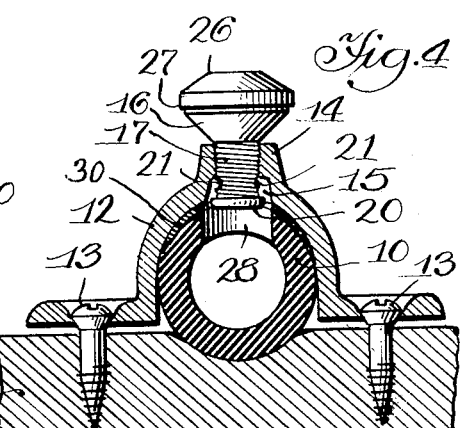
Inventor
CHESTER J. VAN DOREN
By Maxwell F. Cargill Patented June 26, 1934

1,964,097

UNITED STATES PATENT OFFICE 1,964,097

SPRINKLING DEVICE

Chester J. Van Doren, River Forest, Ill., assignor to James D. Van Doren, River Forest, Ill.

Application June 16, 1933, Serial No. 676,049

4 Claims. (Cl. 299—106)

This invention relates to improvements in sprinkling devices.

One object of the invention is to provide sprinkling devices adapted to be attached at intervals along a garden hose to provide a plurality of sprays each of which can be so adjusted as to insure uniform sprinkling at each device or to deliver a greater or less quantity of water at any one or more points as may be desired.

In some sprinkling devices of like nature now in use the quantity of water delivered by the spraying nozzles is greatest near the attached end of the hose and becomes progressively less as the nozzles approach the free end of the hose. This results in certain portions of the lawns or greens being watered more abundantly than other portions and consequently in a non-uniform growth of grass during dry weather.

With the present improvements the individual spraying nozzles function also as regulating valves and can be adjusted readily to provide either a uniform or non-uniform delivery of water along the hose.

Another object of the invention is to provide an adjustable spraying nozzle which may be moved from fully opened to closed position by merely turning the nozzle in a threaded recess, but which nozzle has a locking device at its inner end which prevents the accidental or surreptitious removal of the same from the sprinkling device while the latter is attached to the hose.

A further object is to provide a sprinkling device having a base and clamp adapted to be secured about a perforated portion of the hose, which clamp has a threaded recess communicating with a water chamber in registration with the perforation into which the water flows and into which water chamber the inlet end of a spraying nozzle projects. By this arrangement no portion of the device extends into the hose to impede the flow of water therethrough to successive spraying nozzles.

Other objects and advantages of the invention will be apparent from a consideration of the following specification and accompanying drawing, wherein:

Figure 1 is a perspective of a portion of the hose showing two of my improved sprinkling devices attached thereto;

Figure 2 is an enlarged perspective of one of the devices shown in position on a hose;

Figure 3 is a vertical section taken along the line 3—3 of Figure 2;

Figure 4 is a transverse section taken on line 4—4 of Figure 2;

Figure 5 is a vertical section through one of the spraying devices; and

Figure 6 is a vertical sectional view of a slightly modified form of spraying nozzle.

In the drawing a hose 10 is shown to which a plurality of the devices may be attached for delivering a spray of water at spaced intervals along the length of the hose. Each of the sprinkling devices may comprise a base 11 to which is secured a clamp 12 by means of screws 13. The clamps 12 preferably are provided with bosses 14 which are interiorly threaded as shown in Figures 3 and 4.

On the interior of the clamp 12 in registration with the threaded openings is a recess 15 forming a small water compartment. The spraying nozzle in the form shown comprises a metal funnel shaped device indicated generally by the numeral 16, having a threaded stem 17 which can be screwed into the threaded recess of the boss 14. The stem 17 has a passageway 18 therein closed at its lower end by any approved means. In the form shown a threaded plug 19 is employed, which is provided with a flange 20 of slightly greater diameter than the exterior diameter of the stem 17.

One or more water inlet ports 21 are provided in the lower portion of the stem 17 through which water flows into the nozle 16. The nozzle may be provided with a transverse plate 22 having arcuately shaped depressions 23 formed therein, each of which is provided with a water opening 24. This device gives the water a swirling action as it rises through the nozzle toward the outlet opening 25 which is formed in the cap 26. The cap may have its lower edge 27 crimped or spun inwardly to secure the same to the member 16.

The hose 10 is provided with an opening 28 for each spraying device, the openings being preferably slightly greater in diameter than the flanges 20. As shown in Figure 3 the water flowing through the hose under pressure will rise through the various openings 28 and pass into the spray nozzle through the openings 21 and thence upwardly through the openings 24 and 25.

In Figures 3 and 4 the openings 21 are shown in fully opened position, but it will be seen that by screwing the member 16 outwardly the area of the openings 21 will be decreased as the same enter the threaded portion of the bosses 14.

By continuing the rotation of the member 16 any or all of the spraying devices can be shut off, that is by screwing the devices outwardly until the openings 21 are closed by the threaded portion of the bosses.

Thus by adjusting the various devices 16 along the length of a hose, a spray of water of the desired quantity can be obtained. As the force of the spray generally decreases toward the free end of the hose, the openings 21 can be adjusted to provide a uniform spray throughout the length of the hose.

The threads of the plug 19 are preferably opposite in direction to the external threads of the stem 17 so that as a device 16 is screwed outwardly until the flange 20 abuts the upper surface of the chamber 15, the plug will not be unscrewed. The plugs thus limit the outward movement of the member 16 and prevent their accidental or surreptitious removal.

If desired the lower ends of the members 16 may be constructed as shown in Figure 6, wherein the passage 18a terminates short of the lower end of the stem 17a.

A ring of solder 29 or other stop device may be provided on the lower end of the member 17a to limit the outward movement of the spraying device from the clamp.

To provide a water tight connection between the clamp and hose a soft gasket 30 is employed which, when the clamp 12 is screwed down firmly on the base 11 prevents leakage of water between the clamp and the outer surface of the hose.

As will be noticed the stem 17 does not extend into the interior of the hose to obstruct or impede the free passage of water through the same to subsequent spraying devices.

While I have shown and described an embodiment of my invention for the purpose of illustration, I do not wish to be restricted specifically thereto except as so limited by the appended claims.

I claim:

1. A sprinkling device adapted to be attached to a perforated portion of a hose comprising a base, a clamp attachable to said base about said portion of the hose, said clamp having a threaded recess, and a spraying nozzle having a hollow threaded stem the inner portion of which is adapted to extend through said recess into registration with said perforation, said stem being closed at its inner end and provided with one or more radial water ports in said inner portion for admitting water to said nozzle when in spraying position, said ports being of such size and so located that the wall of said recess will effect the gradual closure of said ports for varying the spraying action of the nozzle as the same is screwed outwardly of said clamp.

2. A sprinkling device adapted to be attached to a perforated portion of a hose comprising a base, a clamp attachable to said base about said hose portion, said clamp having a threaded recess, a spraying nozzle having a hollow threaded stem the inner portion of which is adapted to extend through said recess into registration with said perforation, said stem being closed at its inner end and provided with one or more radial water ports in said inner portion for admitting water to said nozzle when in spraying position, said ports being of such size and so located that the wall of said recess will effect the gradual closure of said ports for varying the spraying action of the nozzle as the same is screwed outwardly of said clamp.

3. A sprinkling device adapted to be attached to a perforated portion of a hose comprising a base, a clamp attachable to said base about said hose portion, said clamp having a threaded recess therein terminating at its inner end in a water chamber communicating with said perforation for receiving water from said hose, and a spraying nozzle provided with a hollow threaded stem disposed in said recess and having an inner portion adapted to project into said water chamber, said stem being closed at its inner end and having one or more radial water inlet ports in said inner portion for admitting water to said nozzle when in spraying position, said ports being of such size and so located that the wall of said recess will effect the gradual closure of said ports for varying the spraying action of the nozzle as the same is screwed outwardly of said clamp.

4. A sprinkling device adapted to be attached to a perforated portion of a hose comprising a base, a clamp attachable to said base about said hose portion, said clamp having a threaded recess therein terminating at its inner end in a water chamber communicating with said perforation for receiving water from said hose, a spraying nozzle provided with a hollow threaded stem disposed in said recess and having an inner portion adapted to project into said water chamber, said stem being closed at its inner end and having one or more radial water inlet ports, said ports being of such size and so located that the wall of said recess will effect the gradual closure of said ports for varying the spraying action of the nozzle as the same is screwed outwardly of said clamp, and means at the inner end of said stem for limiting the outward movement of said nozzle.

CHESTER J. VAN DOREN.